United States Patent [19]

Yamaguchi et al.

[11] Patent Number: 4,507,337
[45] Date of Patent: Mar. 26, 1985

[54] PROCESS FOR PRODUCING A PREPREG OF A GLASS FIBER CLOTH

[75] Inventors: Shigeo Yamaguchi; Tadayoshi Okutsu, both of Fukushima, Japan

[73] Assignee: Nitto Boseki Co. Ltd., Fukushima, Japan

[21] Appl. No.: 627,752

[22] Filed: Jul. 5, 1984

[30] Foreign Application Priority Data

Jul. 6, 1983 [JP] Japan ................. 58-122748

[51] Int. Cl.$^3$ .................... B05D 3/02; B05D 3/12
[52] U.S. Cl. ........................ 427/269; 427/284; 427/289; 427/292; 427/314
[58] Field of Search ............ 427/269, 284, 289, 292, 427/389.8, 314, 381

[56] References Cited

U.S. PATENT DOCUMENTS 3,121,018  2/1964  Wood, Jr. et al. ............. 427/289 X
4,101,693  7/1978  Tsen et al. .................... 427/389.8 X

FOREIGN PATENT DOCUMENTS 156833  9/1951  Australia ..................... 427/314
1004447  9/1965  United Kingdom ............ 427/289

*Primary Examiner*—Evan K. Lawrence
*Attorney, Agent, or Firm*—Bert J. Lewen

[57] ABSTRACT

The process for producing a prepreg of a glass fiber cloth according to the present invention is characterized by heat-treating the inner portions of the selvages of the glass fiber cloth to remove the residual stress of glass fibers in the glass fiber cloth, coating the heat-treated portions of the glass fiber cloth with a solution of a saturated polyester type resin of 150° to 180° C. softening point insoluble in a thermosetting resin varnish to be later used for impregnation so that the amount coated becomes 4 to 10% by weight as resin based on the weight of the portions of glass fiber cloth coated, drying the resulging glass fiber cloth, removing the selvage portions of the glass fiber cloth by cutting, impregnating the selvages-removed glass fiber cloth with the above mentioned thermosetting resin varnish, and drying the impregnated glass fiber cloth. In the prepreg produced according to the present invention, the thickness is uniform across the entire width; both selvages form a linear shape and are not rugged; there is neither tearing-off of glass fibers at the selvages nor adhesion of torn fibers to other portions and hence no quality deterioration of prepreg is incurred. Therefore, the prepreg of the present invention can be advantageously used for production of copper-clad laminates.

4 Claims, No Drawings

PROCESS FOR PRODUCING A PREPREG OF A GLASS FIBER CLOTH

BACKGROUND OF THE INVENTION

The present invention relates to a process for producing a prepreg of a glass fiber cloth, particularly of a belt-shaped glass fiber cloth.

As is well known, prepregs are materials for laminates obtained by impregnating a continuous reinforcing material such as a fabric, a paper, a mat or the like with a thermosetting resin and then drying the impregnated material to cure the resin to B-stage.

The B-stage herein refers to a stage of a thermosetting resin wherein the resin swells but is not completely soluble in liquids such as an alcohol, acetone and the like and, when heated, the resin softens to a consistency close to that of rubber but does not melt completely. Thermosetting resins are generally used for impregnation of glass fiber cloth and the like in the form of varnish.

When prepregs are produced with a belt-shaped glass fiber cloth having fluffy selvages produced by a recent, improved loom such as an air jet loom or the like, the following problems arise.

The first problem is that an impregnated belt-shaped glass fiber cloth contains excessive resin at its selvages and the selvages tend to be thicker than other portions of the cloth. When such a prepreg having selvages of larger thicknesses is cut into pieces each of the same desired dimension and the pieces are laminated, the prepreg laminate has larger thicknesses at its selvages resulting in a laminate of non-uniform thickness. Thus, a prepreg not having a uniform thickness across the entire width brings about various inconveniences when the prepreg is processed into products. As an example, when the prepreg is used for production of a copper-clad laminate, application of a pressure across the entire prepreg width is impossible.

The second problem is that both selvages of a prepreg, when observed in the lengthwise direction of prepreg, are not linear but rugged due to fluffy selvages. When such a prepreg having uneven selvages is cut into pieces of the same desired length and the pieces are laminated, it is difficult to true up the edges of the resulting prepreg laminate and, when the edges are trued up, part of the rugged selvages is torn off, scattered and mixed into the laminate causing a poor quality product.

The third problem is that, during prepreg production, part of the selvages of a glass fiber cloth are torn off and mixed into the impregnation varnish and adhere to the surface of the prepreg causing a poor quality product.

The above are the problems occurring when a prepreg is produced from a belt-shaped glass fiber cloth having fluffy selvages. The first problem mentioned above should also occur with respect to selvages of a glass fiber cloth produced by a shuttle type loom.

In order to avoid the first and second problems mentioned above, selvages of a prepreg may be removed by cutting. This still leaves the third problem unsolved and further reduces yields of glass fiber cloth and varnish, which is not desirable from cost standpoint.

Selvages of a belt-shaped glass fiber cloth may be removed before the cloth is processed into a prepreg. However, no appropriate method has been developed. For example, in Japanese Laid-open Patent Application No. 34094/1977, there is proposed a method wherein, when a glass fiber cloth of wide belt shape is cut in the lengthwise direction to convert it into glass fiber cloths of narrower width, there are applied to the portions to be cut, for prevention of fraying, an adhesive of an acrylic, polyvinyl acetate or polyvinyl chloride resin or of a rubber, preferably an adhesive of a polyvinyl acetate resin compatible with polyester resins. However, it is doubtful whether or not the method is suitable for obtaining a glass fiber cloth of narrow width as a material for a prepreg. Further, even if a glass fiber cloth of narrow width has been produced according to this method and then its selvages have been removed, it is impossible to obtain a satisfactory prepreg free from the above mentioned problems. Also in Japanese Laid-open Patent Application No. 18568/1973, there is proposed a method wherein, when any knitted or woven cloth is cut along the stitch, the portions to be cut are impregnated with a heat-fusible synthetic resin for prevention of fraying. Even by application of this method, no satisfactory prepreg is obtainable.

An object of the present invention is to provide a prepreg of a glass fiber cloth which is free from the above mentioned drawbacks of conventional techniques, has a uniform thickness across the entire width and is linear and not rugged at both selvages and wherein fibers of selvage portions are not torn off and do not adhere to other prepreg portions so that there is no deterioration in quality.

SUMMARY OF THE INVENTION

The present invention relates to a process for producing a prepreg of a glass fiber cloth by impregnating said glass fiber cloth with a thermosetting resin varnish and drying the impregnated glass fiber cloth, characterized by heat-treating the inner portions of the selvages of the glass fiber cloth to remove the residual stress of glass fibers in the glass fiber cloth, coating the heat-treated portions of the glass fiber cloth with a solution of a saturated polyester type resin of 150° to 180° C. softening point insoluble in said thermosetting resin varnish so that the amount coated becomes 4 to 10% by weight as resin based on the weight of the portions of glass fiber cloth coated, drying the resulting glass fiber cloth, removing the selvage portions of the glass fiber cloth by cutting, impregnating the selvages-removed glass fiber cloth with the above mentioned thermosetting resin varnish, and drying the impregnated glass fiber cloth.

DETAILED DESCRIPTION OF THE INVENTION

In the process of the present invention, a glass fiber cloth is freed of its selvages by cutting before the glass fiber cloth is immersed in a thermosetting resin varnish. So as to be able to retain their original shapes, the portions of glass fiber cloth to be cut are coated with a synthetic resin beforehand. Accordingly, this resin must be resistant to the varnish and the temperature employed in prepreg production. The strength of the coated resin for fixing the glass fibers around the cut portions varies at each stage of prepreg production. The strength is weakest in the drying stage wherein the coated resin tends to soften by the influence of the varnish and the drying temperature. In this drying stage, when the moving force of warps of the glass fiber cloth is larger than the above mentioned fixation strength of the coated resin, the shape of the cut portions of glass fiber cloth is altered, whereby the cut portions become wavy and, in an extreme case, the warps at the cut portions are frayed. When glass fibers at the cut portions have a residual stress, the above moving force of the warps is very large. Hence, it is requisite that glass fibers at the portions to be coated with a synthetic resin be made free from a residual stress beforehand.

Compared with organic fibers, glass fibers have larger Young's moduli. Consequently, glass fibers in glass fiber cloths have larger residual stresses. A glass fiber cloth produced by ordinary weaving and post-treatment, when heated in an oven, shows warping at a certain temperature. This warping is larger when each single fiber composing the glass fiber cloth has a larger diameter and also when the glass fiber cloth has larger numbers per inch of warp and/or weft. A larger warping is caused by a larger residual stress.

As mentioned above, production of a prepreg from a glass fiber cloth of large residual stress causes changes in the shape of the resin-coated cut portions. That is, because warps around the cut portions have a moving force larger than the fixation strength of the coated resin, part of these warps moves along the weft outside the cloth, becomes separated from wefts, and is fixed to the prepreg by a varnish in a protruding and wavy shape. This protruding and wavy condition of warps, when observed along the cut portions which should theoretically be linear, forms many continuous or non-continuous waves. These waves are larger in amplitude and height when the glass fiber cloth shows a larger warping. In an extreme case, the protruding and wavy warps cause fraying.

The residual stress can be eliminated by heat treatment. For example, when a glass fiber cloth obtained by ordinary weaving and post-treatment is heat-treated at 600° C. for 20 sec, the cloth after the treatment seldom causes the above mentioned warping seen in heating of glass fiber cloths. Therefore, when a prepreg is produced from this heat-treated glass fiber cloth, the warps of the cut portions of the prepreg do not become wavy and the cut portions become almost linear.

Conditions for heat treatment for elimination of the residual stress of a glass fiber cloth may be optional as long as the residual stress can be eliminated. Elimination of residual stress can be determined by heating the glass fiber cloth in an oven and observing the above mentioned warping. The time for heat treatment can be short when a high temperature is used. A longer heating time is required when a low temperature is used. The upper limit of heat treatment temperature differs depending upon the composition of glass, but it must be lower than a temperature at which a glass fiber cloth becomes fluid, namely, a glass transition temperature. The lowest temperature for heat treatment is preferred to be about 400° C. However even at 250° C., an effect from the heat treatment can be observed. As for the time for heat treatment, a shortest time in which the residual stress is reduced to an intended level can be employed. As for the portions of glass fiber cloth to which the heat treatment for residual stress elimination is applied, the portions to be coated with a resin are appropriate. For practice of heat treatment, there may be employed an appropriate method such as direct heating with a burner. A method using a jet heater which continuously generates hot air of up to about 850° C. is preferable.

The glass fiber cloth subjected to residual stress elimination is coated with a resin dissolved in a solvent, at the portions at which the residual stress has been eliminated, namely, the inner portions of selvages. This resin must be insoluble in a thermosetting resin varnish used at a later stage so that the fixation strength of the resin for glass fibers around the cut portions is not weakened by the solvency of the varnish at a later stage of impregnation of the selvages-removed glass fiber cloth with the varnish.

As thermosetting resins used for impregnation of glass fiber cloths for prepreg production, there are generally employed many epoxy resins and polyimide resins. These resins can preferably also be used in the present invention. These resins are used in the form of varnish wherein each resin is dissolved in a solvent. A glass fiber cloth is immersed in one of these thermosetting resin varnishes and then the solvent in the varnish is evaporated off in a dryer whereby a prepreg is produced. As an example of the thermosetting resin varnish, there can be mentioned a varnish (hereinunder this varnish is referred to as "G-10 varnish") composed of 125 parts of an epoxy resin of bisphenol A type [epoxy equivalent: 500, epoxy value %: 0.20 to 0.22], 4.0 parts of dicyandiamide, 0.2 parts of benzyldimethylamine, 55 parts of acetone, 14.0 parts of dimethylformamide and 3.0 parts of water.

Therefore in the present invention, as the resin used for coating of the inner portions of selvages of glass fiber cloth there is selected a saturated polyester type resin which is insoluble in varnishes of the thermosetting resins used for impregnation.

In addition, the saturated polyester type resin must not soften in a drier at the drying temperature. It is desirable that this resin have a softening point as high as possible. However, a higher softening point results in a lower solubility in solvent, therefore, the upper limit for the softening point is the highest softening point at which the solubility of resin in solvent is retained. Accordingly, the range for softening point as measured by the JIS K 2531 Ring and Ball Method is 150° to 180° C. When the softening point of a resin is lower than 150° C., the fixation strength of the resin for glass fibers around the cut portions becomes too weak at a drying stage and therefore such a resin is unusable.

As a preferable saturated polyester resin, there can be mentioned a resin (hereinunder, this resin is referred to as "T-resin") composed of 100 mole % of acid components (14 mole % of isophthalic acid, 31 mole % of adipic acid and 55 mole % of terephthalic acid) and 100 mole % of a glycol component (1,4-dibutylene glycol).

As the solvent for saturated polyester type resin used in the present invention, a solvent of low toxicity and low boiling point is preferable. A lower boiling solvent can use a lower drying temperature and moreover give a faster evaporation rate after coating. Therefore, the coated resin solidifies faster and there occurs no spreading of coated resin, whereby precise coating becomes possible. As the low boiling solvent, there can be mentioned halogenated lower hydrocarbons such as, for example, methylene chloride, chloroform and the like.

In order to achieve the object of the present invention, the amount of saturated polyester type resin coated is important. When the amount coated is excessive, the coated portions of glass fiber cloth have larger thicknesses than the other portions whereby the previously mentioned first problem arises. When the amount coated is too small, the fixation strength of resin for glass fibers around the coated portions is insufficient whereby the cut portions of glass fiber cloth can not form a linear shape. The amount of resin coated necessary for achieving the object of the present invention is 4 to 10% by weight. 5 to 6% by weight is particularly preferable.

As described above, in the present invention, a glass fiber cloth is heat-treated at the inner portions of its selvages to eliminate the residual stress of the portions; the heat-treated portions are coated with a saturated polyester resin solution and dried; the selvage portions are removed by cutting; the resulting glass fiber cloth is immersed in a thermosetting resin varnish according to the conventional manner; the varnish-impregnated glass fiber cloth is placed in a dryer to evaporate off a solvent contained in the varnish; thereby obtaining a prepreg.

In the present invention, a glass fiber cloth to be processed into a prepreg is freed of its selvages prior to impregnation. Therefore, it does not occur that glass fibers of selvage portions are torn off and mixed into a varnish used for impregnation. Actually, a prepreg produced in accordance with the present invention was cut into sheets each of the same given dimension; these 2,000 sheets were laminated; and the laminate showed a uniform thickness across the entire width.

In the present invention, glass fibers composing a glass fiber cloth to be processed into a prepreg are freed of residual stress at the heat-treated portions of the cloth. Further, the heat-treated portions are treated with a resin whose fixation strength for glass fibers is not much weakened in a later stage of glass fiber cloth impregnation with a varnish. Accordingly, the cut portions of glass fiber cloth retain their shape and remain almost linear even after the cloth has been processed into a prepreg. In an actual automatic production of copper-clad laminates wherein a prepreg produced in accordance with the present invention was cut into sheets each of the same given dimension and the sheets were laminated, truing up of the edges of each laminate was good and each laminate showed neither fiber tearing nor wavy shape at the edges.

Hereinunder, embodiments of the present invention will be explained.

EXAMPLE 1

A belt-shaped glass fiber cloth (style 7628) produced by an air jet loom was subjected to heat treatment at 600° C. for 20 sec at the inner portions of the two selvages. Then, the heat-treated portions of the above glass fiber cloth which was in running were coated in a width of about 10 mm with a methylene chloride solution of a saturated polyester type resin (T-resin) having a softening point of 170° C. as measured by JIS K 2531 Ring and Ball Method and insoluble at room temperature in a varnish of an epoxy resin (G-10) so that the amount coated became 5% by weight as resin based on the weight of the coated portions of glass fiber cloth. The coated portions were dried at about 100° C. Thereafter, the coated portions were cut off to obtain a glass fiber cloth of a constant width which was free from selvages.

The glass fiber cloth was immersed in a G-10 varnish of a resin content of 43% by weight and dried to obtain a prepreg.

In the prepreg, the resin-coated and cut portions had a good, almost linear shape. The prepreg was cut into sheets each of the same given dimension. These 2,000 sheets were laminated. The laminate had a uniform thickness across the entire width.

COMPARATIVE EXAMPLE 1

A prepreg of a glass fiber cloth was produced in the same manner as in Example 1, except that the heat treatment in Example 1 was not conducted.

In the prepreg, there occurred the partial movement of glass fiber warps at the resin-coated and cut portions, whereby these portions had a wavy shape.

COMPARATIVE EXAMPLE 2

A prepreg of a glass fiber cloth was produced in the same manner as in Example 1, except that the coated amount of the solution of a saturated polyester type resin (T-resin) was 3% by weight as resin.

As in the prepreg of Comparative Example 1, also in this prepreg, there occurred the movement of glass fiber warps at the cut portions, whereby the portions had a wavy shape.

COMPARATIVE EXAMPLE 3

A prepreg of a glass fiber cloth was produced in the same manner as in Example 1, except that the coated amount of the solution of a saturated polyester type resin (T- resin) was 12% by weight as resin.

The prepreg was cut into sheets each of the same given dimension and these 2,000 sheets were laminated. Since the saturated polyester type resin-coated portion of each sheet was thicker than the other portions, the laminate, when observed in its lengthwise direction, had a shape such that both ends were higher and the center was lower.

What is claimed is:

1. A process for producing a prepreg of a glass fiber cloth by impregnating said glass fiber cloth with a thermosetting resin varnish and drying the impregnated glass fiber cloth, characterized by heat-treating the inner portions of the selvages of the glass fiber cloth to remove the residual stress of glass fibers in the glass fiber cloth, coating the heat-treated portions of the glass fiber cloth with a solution of a saturated polyester type resin of 150° to 180° C. softening point insoluble in said thermosetting resin varnish so that the amount coated becomes 4 to 10% by weight as resin based on the weight of the portions of glass fiber cloth coated, drying the resulting glass fiber cloth, removing the selvage portions of the glass fiber cloth by cutting, impregnating the selvages-removed glass fiber cloth with the above mentioned thermosetting resin varnish, and drying the impregnated glass fiber cloth.

2. A process for producing a prepreg of a glass fiber cloth according to claim 1, wherein the thermosetting resin is an epoxy or polyimide resin for use in the dry lamination method.

3. A process for producing a prepreg of a glass fiber cloth according to claim 1, wherein the solvent used in the saturated polyester type resin solution is a halogenated lower hydrocarbon.

4. A process for producing a prepreg of a glass fiber cloth according to claim 1, wherein the heat treatment of glass fiber cloth is conducted at a temperature of about 400° C. or higher but same as or lower than the glass transition temperature of the glass fiber cloth.

* * * * *